3,000,792
ANTIBIOTIC ADSORPTION PROCESS
Robert G. Denkewalter and James Gillin, Westfield, N.J., assignors to Merck & Co., Inc., Rahway, N.J., a corporation of New Jersey
No Drawing. Filed May 21, 1957, Ser. No. 660,467
4 Claims. (Cl. 195—80)

This invention relates generally to processes and methods for obtaining antibiotics from crude solutions thereof. More particularly, it is concerned with new and improved processes and methods for recovering and concentrating antibiotics from fermentation broths containing elaborated antibiotics, microorganism mycelia and suitable nutrient media.

Previously the isolation and separation of antibiotics from fermentation broths in which the antibiotics have been grown was accomplished by solvent extraction and ion exchange procedures which involved operation on harvested broths, either filtered or unfiltered.

The present invention is broadly directed to a new technique for isolating antibiotics which have been produced by means of fermentation processes.

An object of this invention is to provide a novel improved process for the separation and purification of antibiotics from the fermentation broths in which such antibiotics are grown.

Another object of this invention is to provide a process for the isolation of antibiotics in high yields.

A further object of the invention is to provide a commercially useful method for the recovery of antibiotic activity from fermentation broths in which such antibiotics are elaborated.

Other objects and advantages of this invention will become apparent in the course of the following detailed description and disclosure.

It has now been found that antibiotics may be isolated from the fermentation broths in which they are grown concurrently with the fermentation. That is, the isolation process may be conducted while the antibiotic is being elaborated. This is achieved by adding the selected ion exchange resin to the fermentation broth and allowing the fermentation to continue for a period of time after the addition of resin.

The surprising feature of this invention, in addition to the increased convenience of operation and saving of time and equipment, is the increased yields obtained by following the practice of the instant invention. The yields are found to be increased about 25% over those yields obtained if the adsorption is conducted upon harvested broth. This increase in yield is produced by conducting the fermentation in the presence of an ion exchange resin which adsorbs the antibiotic as it is elaborated. A further increase in yield is occasioned by eliminating the step of filtering the fermentation broth before further treatment. In addition, the adsorption by the resin is more effectively accomplished by using this process because of longer broth-resin contact times which result from adsorption during the fermentation. Another advantage is that the fermentor itself is used as the site of adsorption, eliminating the necessity of transferring the fermentation broth to another vessel for contacting with the resin.

The fullest potentialities of this invention may be realized with an unstable antibiotic, such as penicillin, whereby in adsorbing the antibiotic as it is formed removes it from solution in which it is notably unstable and subject to the action of chemical and enzymatic degradation.

For the effective utilization of the process of this invention, it is essential that the ion exchange resin be added to the fermentation broth at a time such that the fermentation of the broth may be allowed to proceed in the presence of the resin. The resin may be added as early as at the beginning of fermentation or as late as about one hour from the time of harvest of the fermentation broth. The one hour minimum is that length of time which has been observed to be necessary in order to obtain a substantial recovery of antibiotic activity from the fermentation broth. In a preferred embodiment of the instant invention, the ion exchange resin should be added from about 48 hours after the beginning of fermentation to about 24 hours before harvest of the fermentation broth.

The resin may be added to the fermentation broth in any desired concentration, preferably in concentrations of from about 1% by volume to about 5% by volume, depending primarily on the concentration of antibiotic activity elaborated in the broth.

In the process of this invention the unique and novel feature is that the ion exchange resin is added during the fermentation and the fermentation is then continued in the presence of the resin. Certain antibiotic fermentations, however, are sensitive to contamination by foreign microorganisms. These may, in fact, even cause complete loss of yield of the desired fermentation product, as in the case of penicillin. It is desirable, therefore, to sterilize the ion exchange resin prior to addition to the fermentor. This sterilization may be accomplished by treatment of the resin with heat or steam. If the resin is unstable in the presence of heat, however, the use of an antiseptic such as aqueous alcohol is recommended.

After adsorption, the ion exchange resin having the antibiotic adsorbed thereon may be subjected to the usual techniques for isolation of the antibiotic. The broth and the resin may be separated as by screening. The resin thus separated may be washed to remove any traces of mycelia or unadsorbed chemical impurities present and then eluted with a solution having the capacity to elute from the resin any antibiotic activity adsorbed thereon. The eluate may be subjected to any of a number of suitable treatments such as for example, crystallization or solvent extraction, in order to recover the pure antibiotic from the eluate.

The stripped resin may then be regenerated by treatment with a suitable regenerating solution and reused for the process of antibiotic adsorption or fresh new resin may be added to the fermentor with the regenerated resin if desired. The spent broth may be recontacted with fresh or regenerated resin and again separated as described above.

The invention will now be described with greater particularity, using novobiocin as the antibiotic for the sake of convenience.

Ion exchange resins which are suitable for use in the practice of the process of this invention, in the case of novobiocin, are particulate resins of the strongly basic, polymeric, nitrogenous anion exchange resin class. These are usually resins having quaternary ammonium groups attached to a styrene-divinylbenzene matrix. The "Dowex" resins, available from the Dow Chemical Co., Midland, Mich., for example "Dowex 1–X2," "Dowex 1–X4," and "Dowex 2–X4"; the "Amberlite" resins, available from Rohm & Haas Co., Philiadelphia, Pa., for example "Amberlite IRA–400," "Amberlite IRA–401," and "Amberlite XE–98"; and the "Duolite" resins, available from Chemical Process Co., Redwood City, Calif., for example "Duolite A–40," "Duolite A–101," and "Duolite A–102," are exemplary of this type of resin. While the above resins have been mentioned as illustrative of ion exchange resins which may be used for the adsorption of novobiocin, other ion exchange resins of the strongly basic type may also be used.

It will be appreciated by those skilled in the art that other antibiotics may require other types of ion exchange resins. For example, while penicillin G, another acidic antibiotic, can be adsorbed upon basic anion exchange resins of the type used for novobiocin adsorption, basic antibiotics, such as streptomycin, neomycin, eulicin and cytovirin, for example, require the use of an acidic cation exchange resin for effective adsorption.

Although resin particle size is not critical, resins in the size range of from about 10 mesh to 200 mesh and preferably from about 35 mesh to 100 mesh, have been found to be especially useful in the adsorption.

For separation of the resin having the antibiotic activity of the broth adsorbed thereon from the spent broth, it is desirable to first dilute the broth by the addition of a diluent, such as water. This dilution step, though not necessary to the practice of the instant invention, facilitates the separation of the spent broth and resin. Mixing with the broth an equal volume of water has been found to improve the separation of the resin from the spent broth containing microorganism mycelia, unused nutrient media and various other solid impurities.

The broth containing the resin may then be separated from the resin by screening or any other desired method. Screening the mixture with a screen having a mesh in the size range which is suitable for retaining the resin and passing the mycelia, normally from about 10 mesh to about 200 mesh, has been found to be effective in this separation with no undue clogging of the screen with mycelia or spent broth being observed. To further facilitate this separation, a screen of the vibrating type may be used. Any other separation method such as the use of liquid cyclones, riffle tables or classifiers may be used if desired.

For elution from the ion exchange resin of the antibiotic activity adsorbed thereon an aqueous eluting solution containing an electrolyte is used. In the case of novobiocin, aqueous acidic solutions containing an organic solvent for novobiocin have been found effective. For example, aqueous solutions of hydrochloric acid or acetic acid admixed with a suitable water miscible organic solvent, such as an alcohol or ketone, have been found satisfactory for the elution of novobiocin activity from the ion exchange resin. The concentration of the acidic compound in the eluting solution is preferably from about 1 weight/volume percent to about 10 weight/volume percent. The organic phase may be constituted with from about 70% to about 98% of the organic solvent with from about 30% to about 2% water.

In the case of other antibiotics than novobiocin suitable eluting solutions can be used to elute from the ion exchange resin the antibiotic activity adsorbed thereon. For example, in the case of neomycin and cytovirin, aqueous ammonia is a satisfactory eluting solution. Methanolic hydrochloric acid, on the other hand, is effective for the elution of eulicin and streptomycin.

The method of elution may be either column-wise or batch-wise in operation, although column-wise operation is preferred because smaller volumes are needed and because of the relative ease of periodic analyses of the eluate and division thereof into fractions, which is readily accomplished where a column is used for elution.

The eluate may be subjected to subsequent treatment designed to further purify the eluate such as, in the case of novobiocin, by passing through a chromatographic column, for example, a column of alumina which has been washed with dilute sulfuric acid and water, and treating the purified and decolorized eluate with an acidic solution, for example, a methanol-acetic acid solution, in order to crystallize the novobiocin acid. The resulting crystals may be filtered and washed, such as with a water-methanol solution, filtered and dried. If desired, various novobiocin salts may be prepared from this novobiocin acid by means of suitable neutralization techniques.

The process of the instant invention may be better understood by reference to the following examples. These examples are included for the purpose of exemplification only and are not to be construed as in any way limiting the scope of the instant invention. For instance, other antibiotics than novobiocin, for example streptomycin, neomycin, eulicin, cytovirin, penicillin, and the like, may be isolated from fermentation broths during fermentation according to the process of this invention.

*Example I*

To 29 ml. of novobiocin fermentation broth is added 1 ml. of "Dowex 1–X2" resin, 50–100 mesh, on the chloride cycle, previously sterilized by treatment with anhydrous ethanol. Fermentation is allowed to proceed for a total period of 168 hours. The resin is separated from the spent broth by means of a 70 mesh screen and placed in a 1 cm. x 6 in. column, backwashed with methanol and eluted with a 16% aqueous hydrochloric acid in methanol (2 N) solution at a rate of 0.2 ml. per min. By assay, the eluate is found to contain 20,000 units of novobiocin activity. This eluate assay represents a yield to eluate of 75% based on a parallel run in the absence of resin.

The following table summarizes data obtained using the procedure of Example I at different times of addition of resin.

| Time of Resin Addition (Hrs. After Inoculation) | Time of Harvest (Hrs. After Inoculation) | Volume of Broth (ml.) | Volume of Resin (ml.) | Yield to Eluate (percent) |
|---|---|---|---|---|
| 48 | 180 | 3,000 | [1] 35 | [2] 90 |
| 144 | 168 | 378,500 | [3] 5,000 | [4] 90 |
| 156 | 168 | 2,721 | [3] 35 | [4] 85 |

[1] Resin sterilized with steam.
[2] Based on parallel run in absence of resin.
[3] Resin not sterilized.
[4] Based on activity in broth at time of addition of resin.

*Example II*

To 3,000 ml. of neomycin fermentation broth is added 180 cc. of "Duolite C–25" resin, on the sodium cycle, previously sterilized by treatment with a 70% ethyl alcohol–30% water solution. "Duolite C–25" ion exchange resin is a sulfonated polystyrene-divinylbenzene cation exchange resin having a highly porous structure, which is available from Chemical Process Company, Redwood City, Calif. The resin is added 48 hours after inoculation and the broth is harvested 163 hours after inoculation. The resin is separated from the spent broth by means of a 28 mesh screen, washed with water, placed in a 1 in. column and washed upflow with water to remove residual fermentation solids. The resin is then eluted downflow with a 1 N ammonia solution at a rate of 3 ml./min. By assay the eluate is found to contain an activity corresponding to a yield of 90% based upon a parallel run in the absence of resin.

Neomycin may also be adsorbed upon "Amberlite IRC–50" resin which is an acidic polystyrene-divinylbenzene cation exchange resin deriving its ion exchange characteristics essentially from carboxylic acid groups, available from Rohm & Haas Co., Philadelphia, Pa., and other resins of the acidic, cation exchange resin class.

Various changes and modifications of the invention can be made, and to the extent that such variations incorporate the spirit of the instant invention, they are intended to be included within the scope of the appended claims.

We claim:

1. A process for recovering novobiocin from an aerated fermentation broth which comprises adding to said fermentation broth a strongly basic highly porous anion exchange resin capable of adsorbing novobiocin, allowing the fermentation to proceed in the presence of the resin for a minimum period of about 1 hour, separating said ion exchange resin, and eluting from said ion exchange resin the novobiocin adsorbed thereon.

2. A process for recovering neomycin from an aerated fermentation broth which comprises adding to said aerated fermentation broth an acidic highly porous cation exchange resin capable of adsorbing the neomycin, allowing the fermentation to proceed in the presence of the resin for a minimum period of about 1 hour, separating said ion exchange resin, and eluting from said ion exchange resin the neomycin adsorbed thereon.

3. A process for recovering novobiocin from an aerated fermentation broth which comprises adding to said aerated fermentation broth a strongly basic anion exchange resin having quaternary ammonium groups attached to a styrene-divinyl benzene matrix capable of adsorbing the novobiocin, allowing the fermentation to proceed in the presence of the resin for a minimum period of about 1 hour, separating said ion exchange resin, and eluting from said ion exchange resin the novobiocin adsorbed thereon.

4. A process for recovering neomycin from an aerated fermentation broth which comprises adding to said aerated fermentation broth an acidic sulfonated polystyrene-divinyl benzene cation exchange resin having a highly porous structure capable of adsorbing the neomycin, allowing the fermentation to proceed in the presence of a resin for a minimum period of about 1 hour, separating said ion exchange resin and eluting from said ion exchange resin the neomycin adsorbed thereon.

References Cited in the file of this patent

UNITED STATES PATENTS

| | | |
|---|---|---|
| 2,541,420 | Howe et al. | Feb. 13, 1951 |
| 2,550,939 | Richardson | May 1, 1951 |
| 2,563,794 | Rickes et al. | Aug. 7, 1951 |
| 2,613,200 | McBurney et al. | Oct. 7, 1952 |
| 2,754,295 | Fardig et al. | July 10, 1956 |
| 2,765,302 | Bartels et al. | Oct. 2, 1956 |
| 2,786,831 | Bartels et al. | Mar. 26, 1957 |
| 2,799,620 | Waksman et al. | July 16, 1957 |
| 2,827,417 | Friedman | Mar. 18, 1958 |